US008082326B2

(12) United States Patent  
Sano (10) Patent No.: US 8,082,326 B2
(45) Date of Patent: Dec. 20, 2011

(54) SERVER AND SERVER PROGRAM

(75) Inventor: Toshinobu Sano, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 385 days.

(21) Appl. No.: 12/196,425

(22) Filed: Aug. 22, 2008

(65) Prior Publication Data

US 2009/0077234 A1 Mar. 19, 2009

(30) Foreign Application Priority Data

Sep. 13, 2007 (JP) ................................ 2007-238520

(51) Int. Cl.
*G06F 15/16* (2006.01)

(52) U.S. Cl. ........ 709/219; 709/203; 709/217; 709/227; 709/229

(58) Field of Classification Search .................. 709/203, 709/217, 219, 227, 229
See application file for complete search history.

(56) References Cited

U.S. PATENT DOCUMENTS

| 6,942,143 | B1* | 9/2005 | Iida et al. ....................... 235/379 |
| 7,437,407 | B2* | 10/2008 | Vahalia et al. .................. 709/203 |
| 7,647,385 | B2* | 1/2010 | Encarnacion et al. ........ 709/217 |
| 2005/0138193 | A1* | 6/2005 | Encarnacion et al. ........ 709/230 |
| 2006/0195514 | A1* | 8/2006 | Rogers et al. .................. 709/203 |
| 2007/0033191 | A1* | 2/2007 | Hornkvist et al. ................. 707/9 |
| 2007/0208743 | A1* | 9/2007 | Sainaney .......................... 707/9 |
| 2007/0283046 | A1* | 12/2007 | Dietrich et al. ................ 709/245 |
| 2008/0046587 | A1* | 2/2008 | Sakoh et al. ................... 709/234 |

FOREIGN PATENT DOCUMENTS

| JP | 2005-242737 | 9/2005 |
| JP | 2005-242749 | 9/2005 |

* cited by examiner

*Primary Examiner* — Phuoc Nguyen
(74) *Attorney, Agent, or Firm* — Renner, Otto, Boisselle & Sklar, LLP (57) ABSTRACT

A server comprises a content database for storing content files of a plurality of contents; a content information database for storing the content information of the content; a sharing section for sharing the content information with other server connected to a network; an access control section which permits or prohibits an access from other terminal connected to the network based on access permission information in which terminal specifying information for specifying a terminal to be permitted to access is registered; and a request response section which sends content information to the client in response to a request from the client for the content information. the sharing section shares the access permission information with other server connected to the network, the request response section, when the content information is requested from a client, determines a server which permits the client to access based on the shared access permission information and sends only the content information of the server which permits the client to access, of the shared content information to the client.

5 Claims, 8 Drawing Sheets

| ACCESS PERMISSION INFORMATION ||
|---|---|
| TERMINAL SPECIFYING INFORMATION1 (SERVER SV2) | TERMINAL NAME |
| | IP ADDRESS |
| | MAC ADDRESS |
| TERMINAL SPECIFYING INFORMATION2 (CLIENT CL) | TERMINAL NAME |
| | IP ADDRESS |
| | MAC ADDRESS |

FIG. 3

| SERVER INFORMATION LIST ||
|---|---|
| SERVER INFORMATION 1 (SERVER SV1) | CDS INFORMATRION |
| | CONTENT INFORMATION |
| | ACCESS PERMISSION INFORMATION |
| SERVER INFORMATION 2 (SERVER SV2) | CDS INFORMATRION |
| | CONTENT INFORMATION |
| | ACCESS PERMISSION INFORMATION |

FIG. 4

| NOTICE TERMINAL LIST |
|---|
| TERMINAL SPECIFYING INFOMATION1 (SERVER SV2) |
| TERMINAL SPECIFYING INFOMATION2 (CLIENT CL) |

FIG. 5

| ACESS PERMISSION INFORMATION ||
|---|---|
| TERMINAL SPECIFYING INFORMATION 1 (SERVER SV1) | TERMINAL NAME |
| | IP ADDRESS |
| | MAC ADDRESS |

SERVER AND SERVER PROGRAM

BACKGROUND OF THE INVENTION

1. Field of the Invention

The present invention relates to a server and server program and more particularly to a server and server program capable of sharing content information among plural servers connected to a network.

2. Description of the Related Art

Recently, as a protocol which connects personal computers, peripheral machines and household electric appliances at home with one another so as to provide their functions to one another via a network, universal plug and play (UPnP) has been used (see, for example, patent document 1). The UPnP contains UPnPAV which is the definition specification of a device and service relating to control of audio visual (AV) appliances. Using this UPnPAV realizes a server client system which can distribute music and video on the home network.

Wireless local area network (LAN) has prevailed, so that there are many environments which allow not only home access points but also access points provided in neighboring house and apartment rooms to be accessed. For the reason, the wireless LAN is equipped with a function which prohibits any illegal terminal from connecting to the network by means of cryptographic technology such as wired equivalent privacy (WEP). In the above-described server client system, like the wireless LAN, the server is equipped with a function which limits distribution of content data and content information to only clients allowed to access them to prevent the content from being used by any illegal terminals. According to an adopted method in this case, for example, the server does not respond to a discovery action (action for detecting any network appliance) from a client not allowed to access, simple object access protocol (SOAP) action (action for calling data or service in other computer) or a request for content distribution. This method can be applied not only to exclude any illegal clients but also to a restriction method which permits father and mother of a family to access a content stored in the father's personal computer while not permitting their child to access it.

Figure 9:
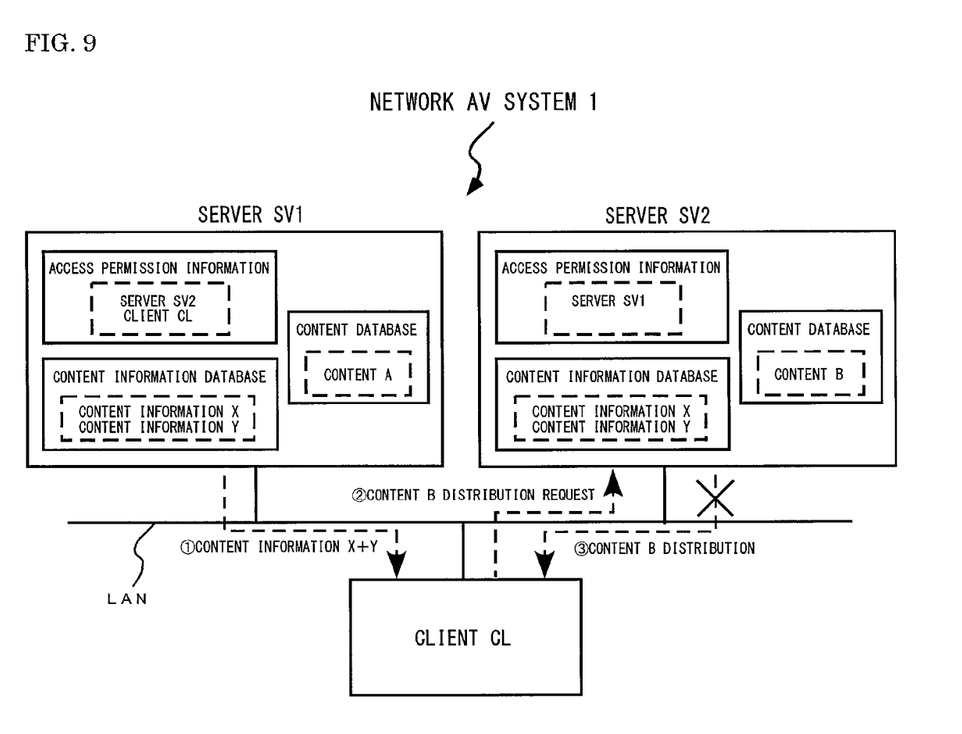
FIG. 9 is a block diagram showing a conventional network AV system 1.

There exists some server which has a function of collecting content information from other server on the home network and providing the collected content information to clients to share that content information. FIG. 9 shows a network AV system 1 having the content information sharing function. In this network AV system 1, a server SV1, server SV2 and client CL are connected through LAN on the network. The server SV1 stores content A in its content database and the content information X of the content A in its content information database. The server SV2 stores content B in its content database and the content information Y of the content B in its content information database. The servers SV1, SV2 share content information X and content information Y of the contents A, B The server SV2 and client CL are registered in the access permission information of the server SV1 so that the server SV1 permit access from the server SV2 and the client CL. Only the server SV1 is registered in the access permission information of the server SV2 so that the server SV2 permits only access from the server SV1.

When a client CL requests the server SV1 for content information, content information X+Y is returned to the Client CL (arrow 1 in FIG. 9). That is, the client CL can select a content to be reproduced from the contents A or B. If the content A is reproduced in the client CL, the content A is distributed from the server SV1 because the content A is stored in the sever SV1 which permits the client CL to access itself and the content CL can reproduce the content A. However, when the client CL reproduces the content B, even if the client CL requests the server SV2 for distribution of the content B (arrow (2) in FIG. 9), the server SV2 cannot distribute the content B to the client CL because the server SV2 does not permit access from the client CL (arrow (3) in FIG. 9). In a conventional server client system, the client CL can acquire content information Y of the server SV2 through the server SV1 although the client CL is not permitted to access the server SV2. Then, even if the client CL attempts to reproduce the content B based on the content information Y, it cannot acquire the content B from the server SV2 because the client CL is not permitted to access the server SV2, and finally the content B cannot be reproduced.

SUMMARY OF THE INVENTION

An object of the invention is to provide a server and server program capable of sharing the content information among plural servers connected to the network, in which of the shared content information, only content information of contents stored in the server that permits a client to access is sent to the client which requests for the content information so as to reproduce the content in the client.

According to the present invention, a server capable of sharing content information among a plurality of servers connected to the network, shares further access permission information, and, when content information is requested from a client, determines a server which permits the client to access, based on the shared access permission information. Then, the server sends only the content information of the server that permits the client to access of the shared content information. Consequently, the client can reproduce the content securely because the received content information does not contain any content that cannot be reproduced (which is not distributed from the server).

In the preferred embodiment of the present invention, the sharing section searches for a server connected to the network, acquires the content information, the access permission information and server specifying information which specifies the server from a found server and registers in server information list as server information, and sends the server information of the own server to other server so as to share the content information and access permission information with the other server connected to the network.

In the preferred embodiment of the present invention, the request response section acquires client specifying information for specifying a client from the client which requests for content information, determines a server which permits the client to access itself based on the access permission information and the client specifying information of each server registered on the server information list, and sends only content information of the server that permits the client to access to the client.

In the preferred embodiment of the present invention, the request response section registers the content information of the server which permits the client to access which requests for the content information in a return candidate list, extracts content information following a condition requested from the client of the content information registered on the return candidate list and sends to the client.

In the preferred embodiment of the present invention, when the access permission information is changed, the access control section notifies other server connected to the network of the change content and when the change content is received from the other server, the access permission information of the other server registered in the server information list is updated based on the change content.

DETAILED DESCRIPTION OF THE PREFERRED EMBODIMENTS

Hereinafter a server and server program of preferred embodiments of the present invention will be described about a network AV system 1 with reference to the accompanying drawings. The present invention is not restricted to these embodiments. In the meantime, by attaching like reference numerals to like portions or equivalent portions, description thereof is omitted.

Figure 1:
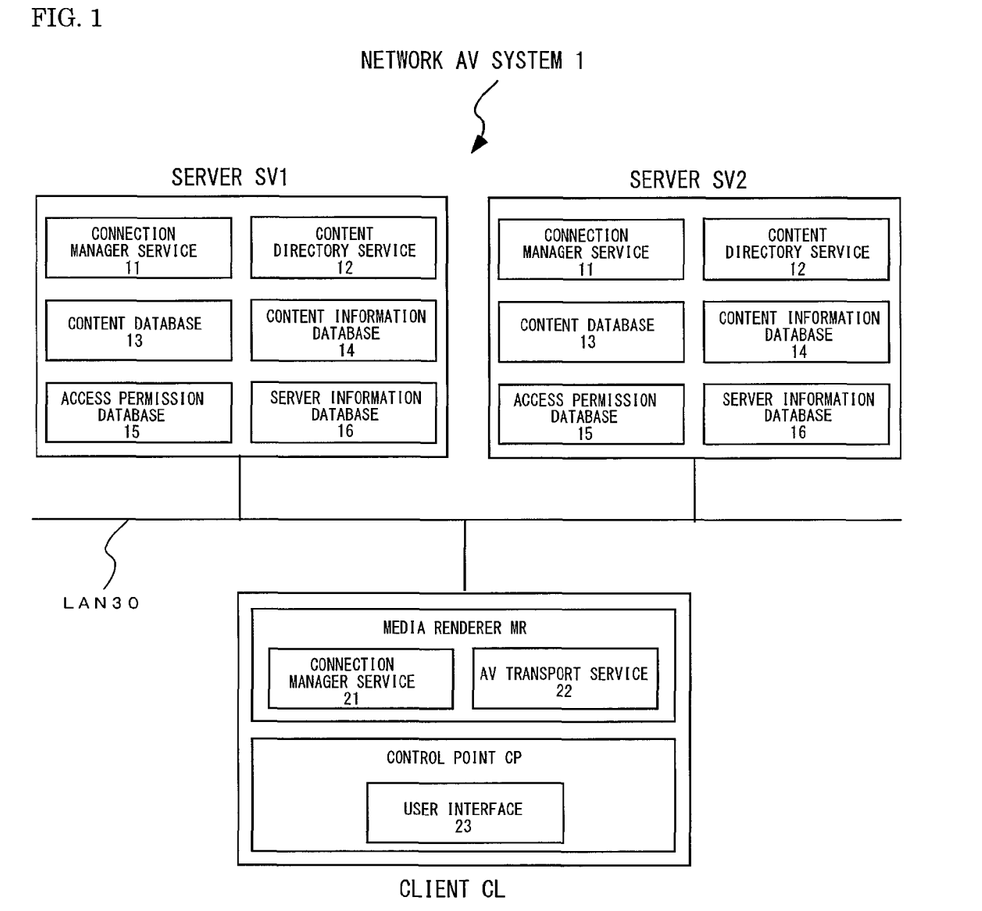
FIG. 1 is a block diagram showing a network AV system 1.

First, the network AV system 1 of the embodiment of the present invention will be described in detail with reference to FIG. 1. FIG. 1 is a schematic block diagram showing the network AV system 1. In the network AV system 1, a server SV1, server SV2 and client CL are connected to one another through LAN 30. Communication protocol for use in this network AV system 1 is UPnPAV and the server SV1, server SV2 and client CL are UPnPAV enabled devices.

The server SV1 stores content files of a plurality of contents and streaming-distributes a content to a client CL in response to a request. The server SV1 includes a connection manager service 11, a content directory service 12, a content database 13 which stores content files, a content information database 14 which stores plural pieces of content information, access permission information database 15 which stores access permission information and server information database 16 which stores server information list. The content file refers to for example, MPEG file, WAVE file and PCM file. The content information refers to information relating to each content file stored in the content database 13 and includes URI which is information indicating a location of each content file, and meta data containing a title and date of each content, artist's name and the like.

The connection manager service 11 establishes and controls a connection for streaming-distributing the content from the server SV1 to the client CL. The content directory service 12 controls the content database 13 and streaming-distributes a content file to the client CL. Further, the content directory service 12 transmits content information to the server SV2 and the client CL in response to a request.

Figure 2:
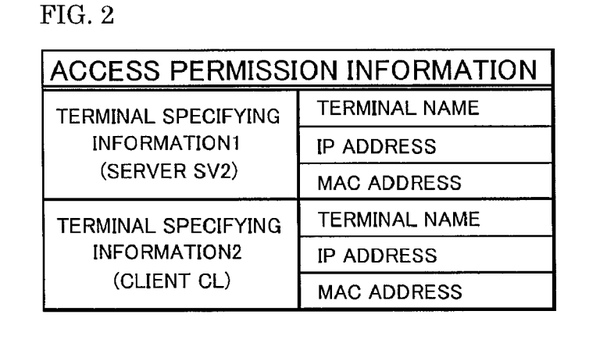
FIG. 2 is a diagram showing access permission information of the server SV1.

The content directory service 12 controls an access from other terminal (server SV2 or client CL in this embodiment) to the server SV1. The content directory service 12 controls access based on access permission information in which terminal specifying information for specifying a terminal permitted to access the server SV1 is registered. Any terminal the terminal specifying information of which is not registered in the access permission information cannot access the server SV1, that is, cannot acquire content information from the server SV1, so that it cannot receive the distribution of the content. In this embodiment, as shown in FIG. 2, the access permission information contains plural pieces of terminal specifying information (server specifying information or client specifying information) and each terminal specifying information contains a terminal name (server name or client name), IP address and MAC address. In the meantime, the content directory service 12 can control an access from other terminal according to only MAC address and if a terminal name and IP address are additionally included as the terminal specifying information as mentioned in this embodiment and those are displayed on a user interface 23 of the client CL described later for user to select from those, user can easily confirm and select a terminal which the server SV1 permits to access.

The access permission information is stored in the access permission information database 15, so that a terminal permitted to access is registered preliminarily by user. In this embodiment, it is assumed that the server specifying information of the server SV2 and client specifying information of the client CL are registered in the access permission information of the server SV1 and that the server SV2 and the client CL can access the server SV1. In this embodiment, the access permission information is defined as AccessPermit as a state variable in the UPnP content directory service. Further, an action of acquiring the access permission information AccessPermit is defined as GetAccessPermit.

Figure 3:
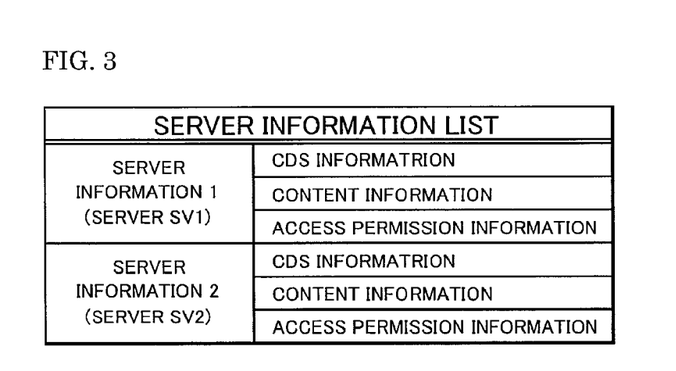
FIG. 3 is a diagram showing server information list of server SV1.

Further, the content directory service 12 shares the content information and access permission information with other sever SV connected to the network. More specifically, the content directory service 12 searches for other server SV connected to the network when the server SV1 is started, acquires server information from a found server SV (server SV2 here) and registers it in the server information list. As shown in FIG. 3, plural pieces of server information are registered in the server information list and each server information contains CDS information, content information and access permission information of the server. The CDS information is server specifying information which contains a service ID for specifying a server SV, URL of content directory service and service description. In the meantime, the service ID, URL of the content directory service and service description are information which is defined according to the UPnP standard. The server information list is stored in the server information database 16 and in this embodiment, it is assumed that the server information of the server SV1 is registered preliminarily. Then, the content directory service 12, after acquiring server information from the server SV2, transmits server information of the server SV1 to the server SV2. To the contrary, if the server information is received from the server SV2, the content directory service 12 updates the server information list based on the received server information. Consequently, the content information and access permission information are shared among plural pieces of the server SVs connected to the network AV system 1.

If the client CL makes a request for content information, the content directory service 12 determines a server SV which permits that client CL to access based on the shared access permission information and transmits only the content information of the server SV to the client CL. More specifically, if the client CL makes a request for the content information, the content directory 12 determines whether or not the MAC address of that client CL is registered in the access permission information of each server SV registered in the server information list. If there is access permission information in which the MAC address of a client CL which makes a request for the content information is registered, only the content information of a content stored in the server SV which issued that access permission information is transmitted to the client CL. Consequently, the client CL can acquire only the content information of the server SV to which it is permitted to access and then, a content is selected based on that content information. As a result, if a request for distribution of the content is made to the server SV, the content is distributed securely.

Figure 4:
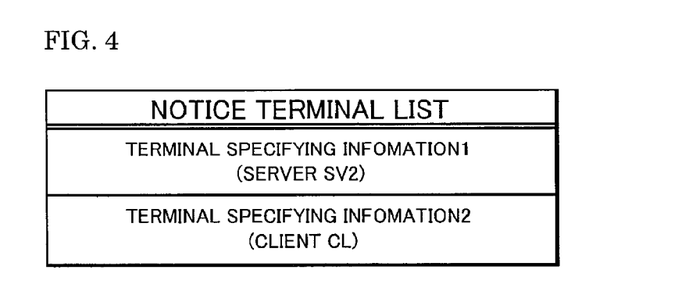
FIG. 4 is a diagram showing a notification terminal list of the server SV1.

Further, if the content information registered in the content information database 14 is changed, the content directory service 12 notifies other terminals registered in the notice terminal list of that change content. As shown in FIG. 4, the notice terminal list refers to a list which registers terminal specifying information of a terminal (server SV or client CL) to be notified of that change content if the content information registered in the content information database 14 is changed. The terminal specifying information mentioned here refers to a terminal name and IP address which can specify any terminal and URL of a notice destination. In the meantime, the notice terminal list is stored in a memory (not shown) provided on for example, the server SV1.

Further, according to this embodiment, if the access permission information registered in the access permission information database 15 is changed, the content directory service 12 notifies the server SV registered in the notice terminal list of that change content. Conversely, if any change content of the access permission information is received from other server SV, the content directory service 12 updates the access permission information of the server SV registered in the server information list based on that change content.

Figure 5:
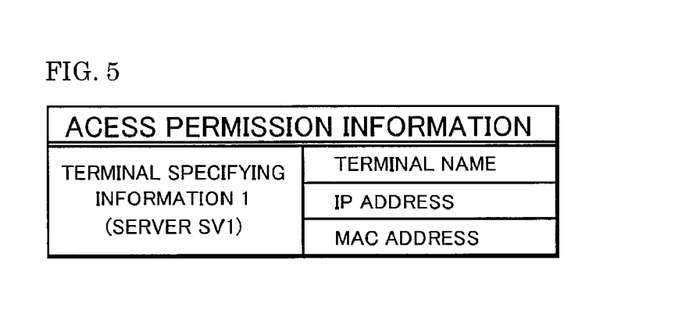
FIG. 5 is a diagram showing access permission information of the server SV2.

Although the server SV2 has the same structure as the above-described server SV1, according to this embodiment, only the terminal specifying information of the server SV1 is registered in the access permission information of the server SV2 as shown in FIG. 5. That is, although the server SV1 can access the server SV2, the client CL cannot access the server SV2. That is, the client CL cannot acquire the content information from the server SV2 and cannot receive distribution of the content.

The server SV1 and the server SV2 are, for example, a computer unit. Further, they may be a DVD player, HDD player, TV tuner, radio tuner, or audio player such as CD player, MP3 player.

The client CL is a content reproducing unit which reproduces a content distributed from the server SV1 or server SV2, for example, a computer unit. It may be TV, stereo or audio player. The client CL contains a media renderer MR and control point CP. The media renderer MR reproduces content data stream-distributed from the server SV1 or the server SV2. The control point CP requests the server SV1 or the server SV2 for content information and content data and selects a media renderer MR for reproducing that content. According to this embodiment, because the media renderer MR is provided on only the client CL, the content distributed from the server SV1 or server SV2 is reproduced by the client CL. The control point CP controls a connection manager service 21 described later and the connection manager service 11 of the server SV1 and server SV2 and make the connection manager service 21 and the connection manager service 11 control establishment of streaming-transmission path between the server SV1 (or server SV2) and the client CL and the streaming transmission.

The media renderer MR contains the connection manager service 21 and the AV transport service 22. The connection manager service 21 establishes the streaming transmission path for downloading a content from the servers SV1, SV2 and control the transmission path. The AV transport service 22 requests the servers SV1, SV2 to streaming-distribute a desired content. The AV transport service 22 controls reproduction of a streaming-distributed content.

The control point CP contains a user interface 23. The user interface 23 coordinates operations of the server SV1 (or server SV2) and the media renderer MR. The user interface 23 displays content information received from the server SV1 (or server SV2) and enables user to select a content.

Hereinafter, an operation of the above-described network AV system 1 will be described in detail with reference to FIG. 6-FIG. 8.

<Server Information Acquisition Processing>

Figure 6:
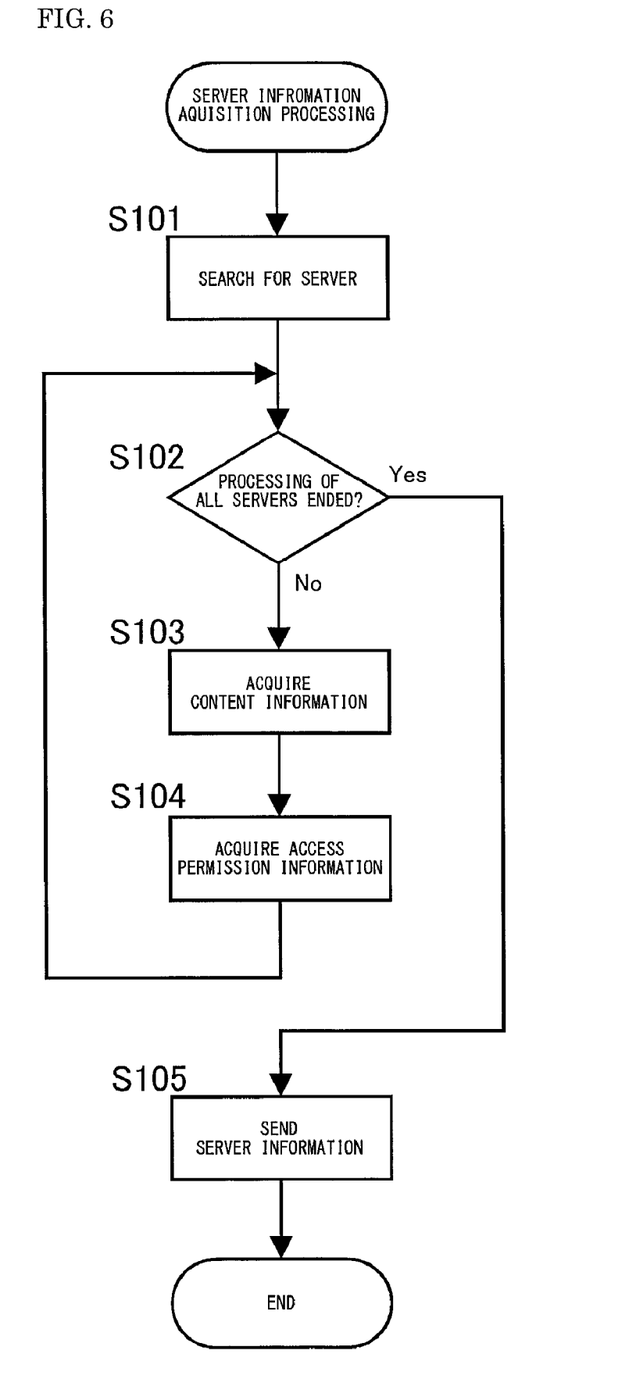
FIG. 6 is a flow chart showing server information acquisition processing.
Figure 7:
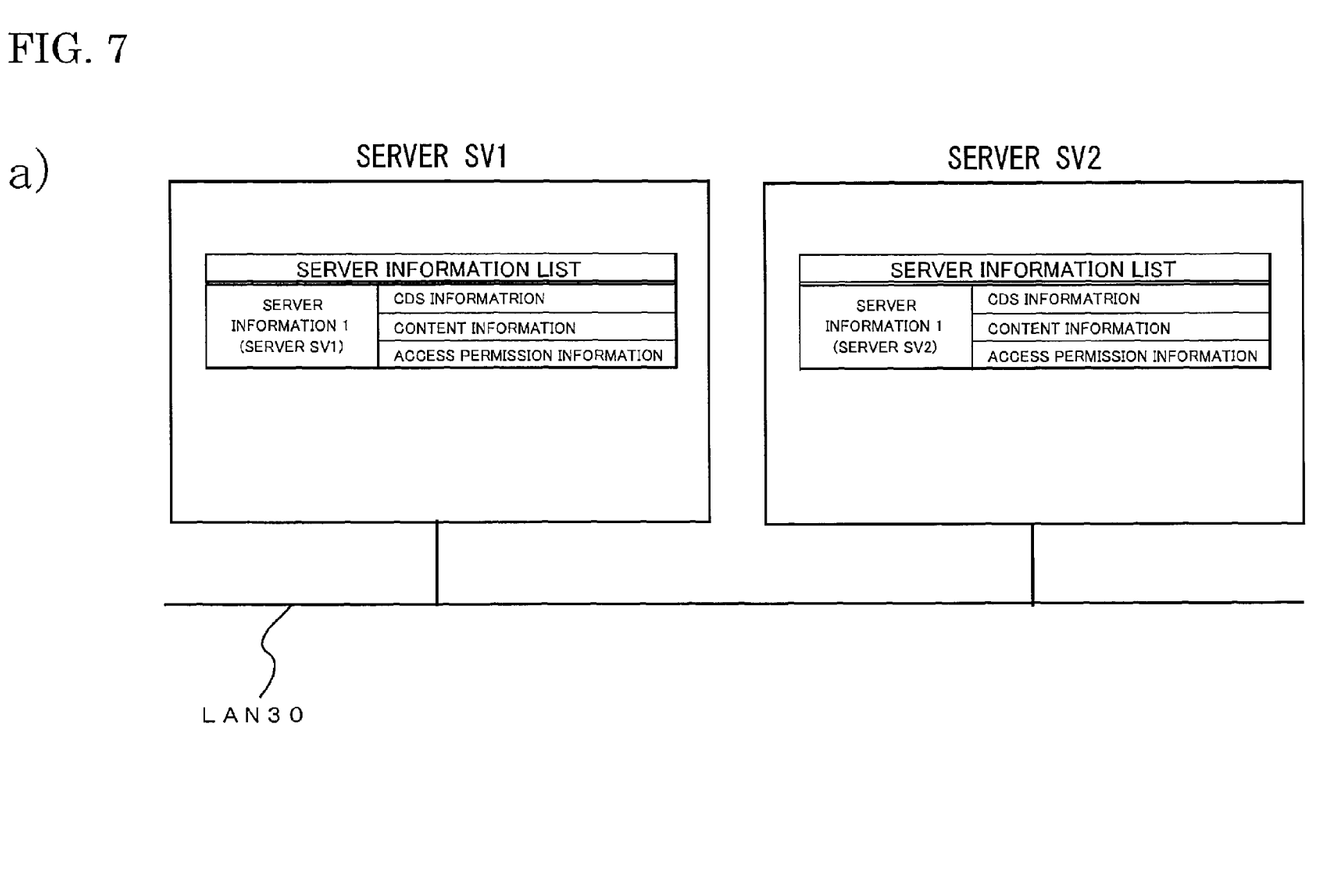
FIG. 7 is a block diagram showing a sharing condition of content information and access permission information in the server SV1 and server SV2.

FIG. 6 is a flow chart showing server information acquisition processing of the content directory service 12. FIG. 7 is a block diagram showing the sharing condition of content information and access permission information of the server SV1 and server SV2. At a current stage, in the network AV system 1, only the server SV2 and the client CL are connected to each other and just after the server SV1 is started (connected), as shown in FIG. 7(a), the content information and access permission information are not shared. That is, the server information lists possessed by the server SV1 and server SV2 contain only server information of each.

When the server SV1 is started, the content directory service 12 of the server SV1 executes server information acquisition processing. More specifically, the content directory service 12 of the server SV1 searches for other server connected to the network and registers CDS information of a found server SV in the server information list as server information (S101). Because in this embodiment, other servers connected to the network than the server SV1 is only the server SV2, the server SV1 finds out the server SV2 and acquires the CDS information from the server SV2 and then register it in the server information list as server information of the server SV2.

Next, the content directory service 12 of the server SV1 acquires content information and access permission information from all found servers and registers them in the server information list as server information of server information of each (S102-S104). First, in this embodiment the content directory service 12 of the server SV1 determines whether or not the content information and access permission information have been acquired from all the found servers (S102). Because just after processing of step S101, the content directory service 12 has not acquired the content information and access permission information from the server SV2 yet, it is determined that the content information and access permission information have not been acquired from all the found servers SV (S102: NO). Then, the content directory service 12 acquires content information of contents stored in the server SV2 from the server SV2 and registers it on the server information list as server information of the server SV2 (S103). Then, the content directory service 12 sends acquisition action GetAccessPermit of the access permission information to the server SV2, acquires the access permission information from the server SV2 and registers on the server information list as server information of the server SV2 (S104). Then, the content directory service 12 returns to step S102. Because in this embodiment, no other server SV than the server SV2 is connected to the network, the content directory service 12 determines that the content information and access permission information have been acquired from all the found servers in step S102 (S102: YES). According to the sharing condition of the content information and access permission information in the server SV1 and server SV2, as shown in FIG. 7(b), the server information of the server SV2 is added to the server information list of the server SV1.

Next, because the server SV2 finds out that the server SV1 has been started and the server SV2 requests the server SV1 for server information of the server SV1, the content directory service 12 of the server SV1 sends its own server information (S105) and terminates the server information acquisition processing. The content directory service 12 of the server SV2 updates the server information list based on the received server information of the server SV1. Consequently, as shown in FIG. 7(c), the server information of the server SV1 is added to the server information list of the server SV2 and as a result, the content information and access permission information are shared between the servers connected to the network AV system 1.

<Content Information Request Response Processing>

Figure 8:
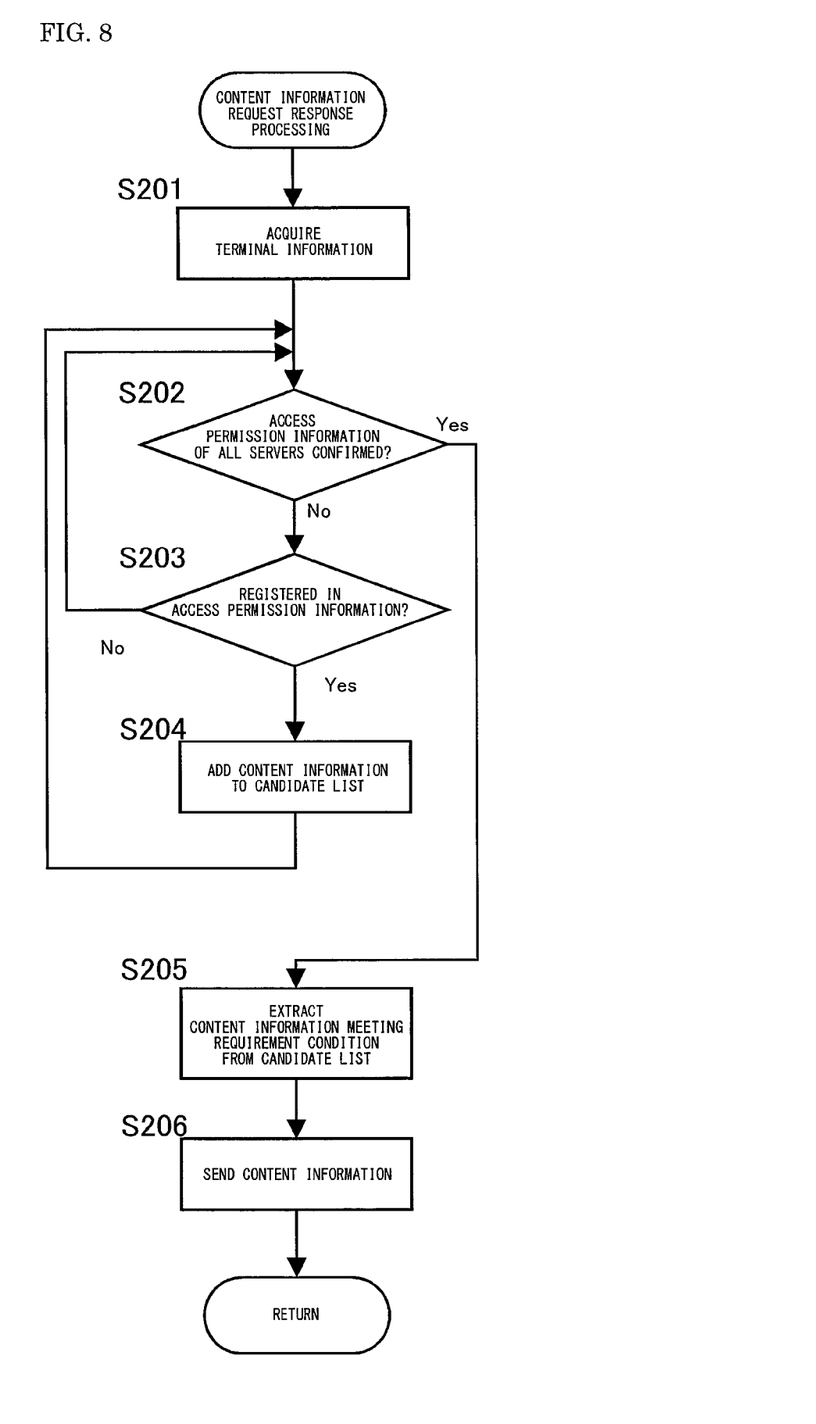
FIG. 8 is a flow chart showing content request response processing.

FIG. 8 is a flow chart showing content information request response processing of the content directory service 12. If a request for the content information is made from the client CL to the server SV1, the content directory service 12 of the server SV1 acquires client specifying information from that client CL (S201). More specifically, the content directory service 12 acquires MAC address of the client CL which makes a request for the content information.

Next, the content directory service 12 of the server SV1 adds only the content information of the server SV that the client CL is permitted to access based on the access permission information to a return candidate list (S202-S204). More specifically, the content directory service 12 of the server SV1 determine whether or not the processing of step S203 described later is executed for the access permission information of all servers registered on the server information list of the server SV1 (S202). Here, because it is just after the MAC address is acquired from the client CL, the content directory service 12 of the server SV1 determines that the processing of step S203 is not executed for the access permission information of all the servers registered on the server information list of the server SV1 (S202: NO). Next, the content directory service 12 of the server SV1 determines whether or not the MAC address of the client CL is registered in the access permission information of the server SVn (S203). More specifically, the content directory service 12 of the server SV1 checks the access permission information of the server SV1 registered on the server information list of the server SV1 to determine whether or not the MAC address of the client CL is registered therein. Because in this embodiment described above and shown in FIG. 2, the MAC address of the client CL is registered in the access permission information of the server SV1, the content directory service 12 of the server SV1 determines that the MAC address of the client CL is registered in the access permission information of the server SV1 in step S203 (S203: YES). Consequently, the content directory service 12 of the server SV1 determines that the client CL is permitted to be accessed from the server SV1 and adds the content information of the server SV1 to the return candidate list (S204). The return candidate list is a list in which the content information to be sent to the client CL is registered temporarily.

After step S204 is executed, the content directory service 12 of the server SV1 returns to step S202. At this stage, the content directory service 12 of the server SV1 has not yet executed processing of step S203 about the access permission information of the server SV2 registered in the server information list of the sever SV1. Thus, the content directory service 12 of the server SV1 determines NO in step S202 and executes processing of next step S203. In step S203, the content directory service 12 of the server SV1 determines whether or not the MAC address of the client CL is registered in the access permission information of the server SV2 registered in the server information list of the server SV1. Because in this embodiment described above and shown in FIG. 5, no MAC address of the client CL is registered in the access permission information of the server SV2, the content directory service 12 of the server SV1 determines that no MAC address of the client CL is registered (S203: NO) and returns to step S202 immediately. At this stage, the processing of step S203 has been executed about the access permission information of all the servers registered in the server information list of the server SV1. Therefore, the content directory service 12 of the server SV1 determines YES in step S202 and select content information meeting a requirement condition from return candidate list (S205). More specifically, if condition of the content information required from the client CL is, for example, artist name list, an artist name is selected from the content information registered in the return candidate list. Then, content information about a selected artist name is sent to the client CL (S206) and then, content information request response processing is terminated. Consequently, the content information which the client CL receives is only content information of contents stored in the server SV1. Thus, the client CL can reproduce a content by requesting only the server SV1 for distribution of the content.

Next, content information request response processing of the content directory service 12 of the server SV1 in case where not only the server SV1 but also the client CL is registered in the access permission information of the server SV2 will be described. Description of the same content as the above-described content information request response processing is omitted. In step S203, the content directory service 12 of the server SV1 determines whether or not the MAC address of the client CL is registered in the access permission information of the server SV1 and the server SV2 registered in the server SV 1. Because the MAC address of the client CL is registered in the access permission information of the server SV1 and the server SV2, the content directory service 12 of the server SV1 determines that the client CL is permitted to access the server SV1 and the server SV2 and then, adds the content information of the server SV1 and the server SV2 to the return candidate list (S204). After that, content information meeting the requirement condition is selected from the return candidate list (S205) and the selected content information is sent to the client CL (S206). That is, because the content information which the client CL receives is the content information of contents stored in the server SV1 and the server SV2, the client CL can request both the server SV1 and the server SV2 for distribution of content so as to reproduce the content.

The preferred embodiment of the server of the present invention has been described above, however, the above-described embodiment is only exemplification for carrying out the present invention.

Although the structure of the network AV system 1 indicated in this embodiment is comprised of two servers SV1, SV2 and a client CL, it may be constructed of a plurality of the servers SV and clients CL.

Although according to this embodiment, server information of the server SV1 is preliminarily registered in the server information list stored in the server information database 16 of the server SV1, it is permissible to collect the CDS information, content information and access permission information and register them in the server information list as its own server information at the time of server information acquisition processing.

When sending the server information list created when the content information or access permission information is updated or the server SV1 is started, the terminal notified of the change content and server information list is made a terminal registered in the notice terminal list. However, it is permissible to provide the notice terminal lists individually for notification of content information change, notification of access permission information change and sending of server information list.

Although in this embodiment, the media renderer MR is provided on only the client CL, the server SV may be provided with the media renderer MR so as to enable the media renderer for reproducing the content to be selected corresponding to the control point CP.

Although the present invention can be adopted in the server client system, particularly it can be adopted preferably in the network AV system using the UPnP as communication protocol.

What is claimed is:

1. A server comprising:
a content database for storing content files of a plurality of contents;
a content information database for storing content information corresponding to the plurality of contents;
a sharing section for sharing the content information with another server connected to a network;
an access control section which permits or prohibits access to the plurality of contents from a terminal connected to the network based on access permission information in which terminal specifying information for specifying a terminal to be permitted to access is registered; and
a request response section which sends content information to the terminal in response to a request from the terminal for the content information,
wherein the sharing section receives shared access permission information from the another server connected to the network which specifies contents on the another server to which the terminal has access,
the request response section, when the content information is requested from the terminal, determines contents of the another server to which the terminal has access based on the shared access permission information and registers only the content information of the contents of the another server to which the terminal is permitted access, and
the request response section registers the content information of the contents of the server and the another server to which the terminal is permitted access in a return candidate list, extracts content information following a condition requested from the client of the content information registered in the return candidate list, and sends the extracted content information to the client.

2. The server according to claim 1 wherein the sharing section searches for a server connected to the network, acquires the content information, the access permission information and server specifying information which specifies the server from a found server and registers in server information list as server information, and sends the server information of the own server to other server so as to share the content information and access permission information with the other server connected to the network.

3. The server according to claim 2 wherein the request response section acquires client specifying information for specifying a client from the client which requests for content information, determines a server which permits the client to access itself based on the access permission information and the client specifying information of each server registered on the server information list, and sends only content information of the server that permits the client to access to the client.

4. The server according to claim 1 wherein when the access permission information is changed, the access control section notifies other server connected to the network of the change content and when the change content is received from the other server, the access permission information of the other server registered in the server information list is updated based on the change content.

5. A non-transitory computer readable medium storing a server program including: a content database for storing content files of a plurality of contents; a content information database for storing content information corresponding to the plurality of contents; and an access control section which permits or prohibits access to the plurality of contents from a terminal connected to the network based on access permission information in which terminal specifying information for specifying a terminal which permits an access thereto,
the server program being an operation program of a server which streaming-distributes a content to the terminal in response to a request, the server program when executed performs:
a step of receiving content information and shared access permission information from another server connected to the network, wherein the received shared access permission information specifies content on the another server to which the terminal has access;
a step of when content information is requested from the terminal, determining contents of the another server to which the which the terminal has access based on the shared access permission information; and
a step of registering only the content information of the contents of the another server to which the terminal is permitted access;
wherein the content information of the server and the another server to which the terminal is permitted access is registered in a return candidate list, the content information is extracted following a condition requested from the client of the content information registered in the return candidate list, and the extracted content information is sent to the client.

* * * * *